United States Patent [19]

Matthias et al.

[11] Patent Number: 5,165,778
[45] Date of Patent: Nov. 24, 1992

[54] AQUARIUM LIGHTING SYSTEM

[75] Inventors: John D. Matthias, San Jose; Roger W. Peterson, Santa Clara; Stuart A. Schwalbe, San Jose, all of Calif.

[73] Assignee: Universal Fiber Optics, Inc., Santa Clara, Calif.

[21] Appl. No.: 609,239

[22] Filed: Nov. 5, 1990

Related U.S. Application Data

[63] Continuation-in-part of Ser. No. 433,741, Nov. 9, 1989, abandoned, which is a continuation-in-part of Ser. No. 402,874, Sep. 5, 1989, abandoned.

[51] Int. Cl.5 ............................................. F21V 33/00
[52] U.S. Cl. ..................................... 362/101; 362/32; 362/122; 362/800
[58] Field of Search ............... 362/26, 32, 96, 101, 362/122, 800, 805, 808, 810; 439/230

[56] References Cited

U.S. PATENT DOCUMENTS

| | | | |
|---|---|---|---|
| 3,292,579 | 12/1966 | Buchanan | 362/101 |
| 3,326,183 | 6/1967 | Buchanan | 362/101 |
| 3,326,185 | 6/1967 | Perez | 362/101 |
| 3,558,958 | 1/1971 | Tartakoff | 362/101 |
| 3,563,204 | 2/1971 | Szllagyi | 362/101 |
| 3,564,231 | 2/1971 | Bruce | 362/32 |
| 3,609,343 | 9/1971 | Howlett | 362/32 |
| 3,624,385 | 11/1971 | Wall | 362/32 |
| 3,749,901 | 7/1973 | Clough | 362/101 |
| 3,775,606 | 11/1973 | Bazell et al. | 362/32 |
| 3,849,700 | 11/1974 | Johnson | 439/230 |
| 3,908,598 | 9/1975 | Jewson | 362/101 |
| 4,103,322 | 7/1978 | Thompson | 362/101 |
| 4,556,930 | 12/1985 | Mori | 362/32 |

FOREIGN PATENT DOCUMENTS

205598 5/1955 Australia.

Primary Examiner—Ira S. Lazarus
Assistant Examiner—Sue Hagarman
Attorney, Agent, or Firm—Flehr, Hohbach, Test, Albritton & Herbert

[57] ABSTRACT

An aquarium lighting system for underwater illumination of an aquarium tank. The light sources each include an elongated insulated wire having a light emitting diode on one end. A water impervious encapsulating layer of material extends over the LED lens and preferably seals and electrically insulates the connection between the elongated wire and the light emitting diode. The wire insulation is both waterproof and watertight. The plug has an opening extending therethrough which cooperates with an attachment mechanism such as a tie wrap or a suction cup to facilitate attaching the light emitting diode to either an object within the tank or the tank walls. A decorative aquarium volcano and display stand also are shown.

19 Claims, 6 Drawing Sheets

AQUARIUM LIGHTING SYSTEM

RELATED APPLICATIONS

This application is a continuation-in-part application of co-pending application Ser. No. 433,741, filed Nov. 9, 1989, now abandoned, entitled "Aquarium Lighting System," which was a continuation-in-part application of co-pending application Ser. No. 402,874, filed Sept. 5, 1989, now abandoned, entitled "Aquarium Lighting System."

TECHNICAL FIELD

The present invention relates, generally, to aquarium lighting systems. More particularly, the invention relates to underwater aquarium lighting and decorative underwater lighted objects.

BACKGROUND ART

Many aquarium enthusiasts spend a great deal of time and money attempting to decorate the underwater interior of their aquarium tanks. Conventional aquarium lighting systems use 120 volt fluorescent or incandescent light bulbs which are typically carried by a tank cover to provide overhead lighting for the aquarium. See, e.g., U.S. Pat. No. 3,908,598. However, the bright white light generated by such lighting tends to physically disturb certain species of fishes. It also often artificially alters the true colors of the fishes and various decorative items placed within the tank.

It has been observed that underwater lighting systems tend to better illuminate the tank and its inhabitants than cover-mounted light bulbs since the light strikes the objects within the tank from a different angle. However, conventional internal (underwater) lighting systems tend to be bulky due to the necessity of isolating and insulating the electrical components to prevent harm to the living organisms within the tank. Thus, internal underwater light sources are not widely used.

It has also been noted that the appearance of the fish and aquarium accessories within a tank can be markedly enhanced by controlling the color of the light which passes through the tank. For example, U.S. Pat. No. 3,558,958 discloses a blue-red aquarium incandescent lamp which uses a titanium dioxide based material to coat an incandescent lamp to filter the green and yellow components out of white light. However, such an arrangement is not well suited for underwater applications since the light has relatively high voltage and power requirements. Thus, in the event that an underwater lighting system using such a component is not well insulated or the insulation fails, the tank's fishes and other inhabitants would be electrocuted or otherwise harmed.

Fiber optic lighting systems also have been used for underwater aquarium lighting. Thus, U.S. Pat. No. 3,749,901 employs fiber optic underwater lighting assemblies, but such systems also employ bulky and unsightly electrical seal assemblies. Moreover, the fiber optic lights lack the lighting intensity and flexibility in their applications which would otherwise be desirable. See, also, U.S. Pat. No. 3,609,343.

Convention underwater aquarium lighting also can generate unwanted heat, have an undesirably short operating life and be poorly adaptable for decorative use in small scale underwater environments. Other underwater aquarium lighting systems are disclosed in U.S. Pat. Nos. 3,326,183, 3,292,579, 3,326,185, 3,563,204 and 4,103,322.

Therefore, there is a need for an aquarium lighting system that includes light weight underwater light sources that do not pose a risk to the tank's inhabitants and which can be used to compliment ornamental decorations within the tank. Such lighting systems should have a long operating life, be easily adapted to a variety of applications and provide significant light output.

Accordingly, it is a primary objective of the present invention to provide an aquarium lighting system that includes low power light sources which may be readily placed at various locations within an aquarium to accent the ornamental appearance of the tank as well as to provide some illumination.

Another objective is to provide a modular lighting system which readily allows the addition of light sources to the tank and the placements of the light sources at a wide variety of locations within the tank.

Another objective is to provide an internal aquarium lighting system that is not hazardous to the occupants of the tank.

Still a further object of the present invention is to provide an aquarium light system which has a long operating life, is compact, is easily installed adaptable to a wide variety of decorative objects and is relatively low in cost.

DISCLOSURE OF INVENTION

In one aspect the submersible aquarium light source assembly of the present invention includes an electrical light, insulated conductor electrically connected to the light and a seal between the light and conductor. The improvement in the aquarium light assembly is comprised, briefly, of using a light emitting diode as the electrical light and encapsulating the lens of the light emitting diode with a light transmissive material to seal it against contact with water. In the preferred form the seal between the conductor and light, as well as encapsulation of the diode lens, is provided by a continuous, solid, molded, relatively clear, plastic envelope.

In another aspect of the present invention, an aquarium lighting system is disclosed which includes a power supply that provides a low voltage electrical signal to a multiplicity of light sources disposed within the tank through a junction box having a multiplicity of connectors thereon. Each of the connectors is adapted to receive a lighting source connector to provide electrical power to the associated lighting source. The lighting sources each include an elongated insulated wire having a light emitting diode on one end and the electrical connector on the other. An insulating plug is provided to seal and electrically insulate the connection between the elongated wire and the light emitting diode, and the diode lens is covered by a clear plastic coating. The wire insulation is both waterproof and watertight. The plug has a bore hole extending therethrough which cooperates with an attachment mechanism such as a tie wrap or a suction cup to facilitate attaching the light emitting diode to either an object within the tank or the tank walls.

Finally, a decorative aquarium volcano also is disclosed which includes a hollow body having both a light source and gas emitting assembly for discharge of gas bubbles and emission of light from an open top of the volcano.

BRIEF DESCRIPTION OF THE DRAWING

The features of the present invention that are believed to be novel are set forth with particularity in the appended claims. The invention, together with further objects and advantages thereof, may best be understood by reference to the following description, taken in conjunction with the accompanying drawings in which:

BEST MODE OF CARRYING OUT THE INVENTION

Figure 1:
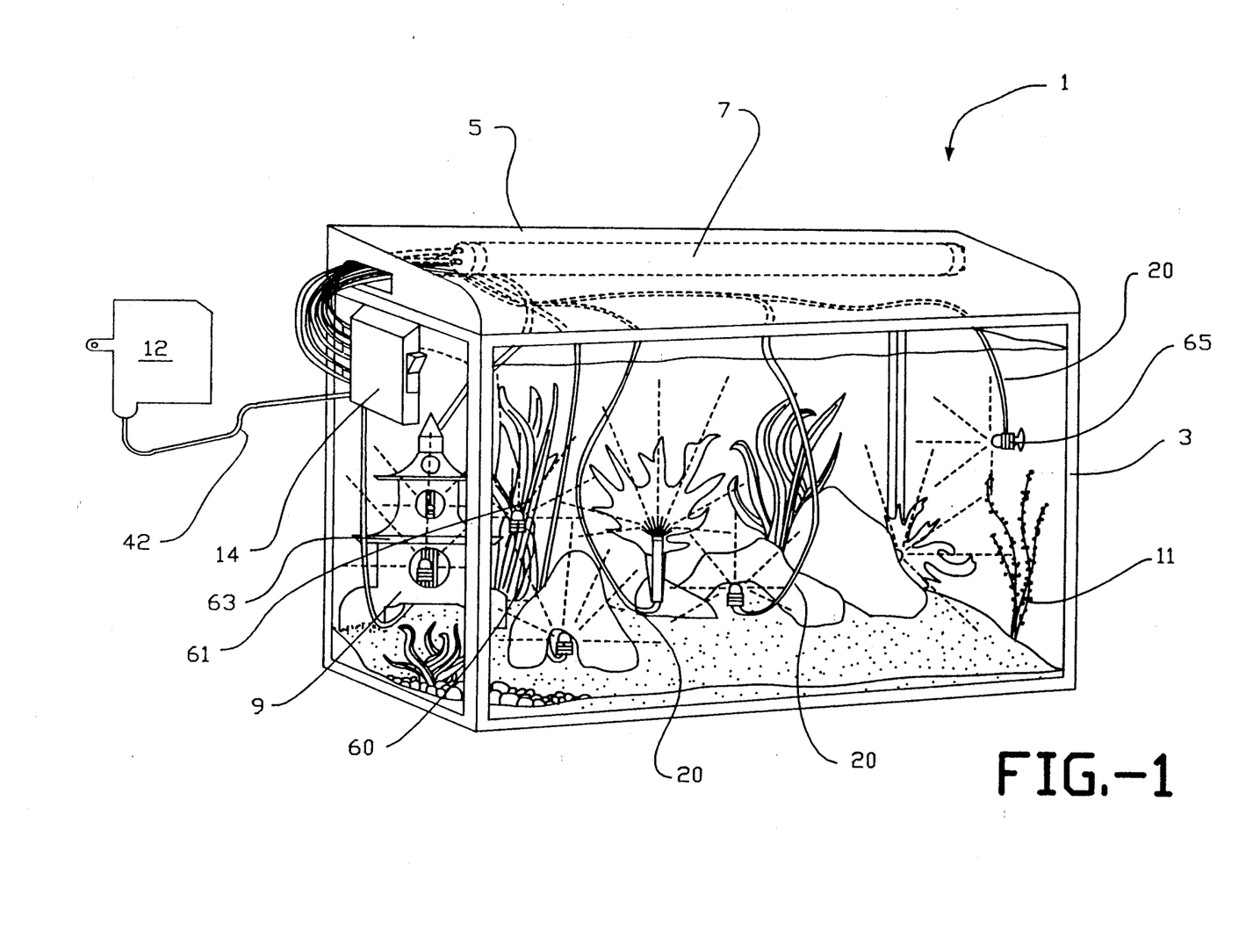
FIG. 1 is a perspective view of an aquarium lighting system constructed in accordance with the present invention.

As illustrated in the drawings, the present invention relates to a lighting system for illuminating an aquarium 1. In the embodiment chosen for the purposes of illustration, the invention is used with an aquarium 1 that includes a tank 3 having a cover 5. A fluorescent bulb 7 is carried by the cover 5 to provide background lighting for the tank. The bulb 7 would typically be positioned such that it is not directly visible to persons looking at the tank. A variety or ornamental figurines 9 and plants 11 may be placed within the tank for decorative purposes.

The lighting system of the present invention includes a multiplicity of light sources 20 that are placed at various locations throughout the tank to enhance its appearance. For example, the light source can be placed within various ornamental figurines such as castles, lighthouses, volcanos, geodes, simulated crystals, etc., or attached directly to objects within the tank, such as plants, coralline rocks, the tank walls, display stands and the like. The light sources are powered by a power supply 12 that is arranged to provide a low voltage electrical signal. A junction box 14 couples the power supply to the various light sources.

While light assemblies have been provided for aquariums which have water-tight seals between the light and the electrical wire connected to the light, such light assembly sealing systems have been relatively bulky, and the lights themselves have either been conventional glass bulb lights or fiber optic arrays. In the light assembly of the present invention three significant improvements have been made.

First, the light source is a light emitting diode, not a conventional bulb or a fiber optic array. Light emitting diodes are capable of extended operation, generate only a small amount of heat, and are small enough for use in a wide variety of aquarium decorative applications. Second, not only is the connection to the diode sealed, the lens of the light emitting diode is coated with a transmissive (transparent or translucent) layer to seal the lens against contact with water. Third, the connection seal and the lens coating are preferably provided as a continuous cast or molded compact plastic envelope, which also can include a light mounting structure.

Figure 8:
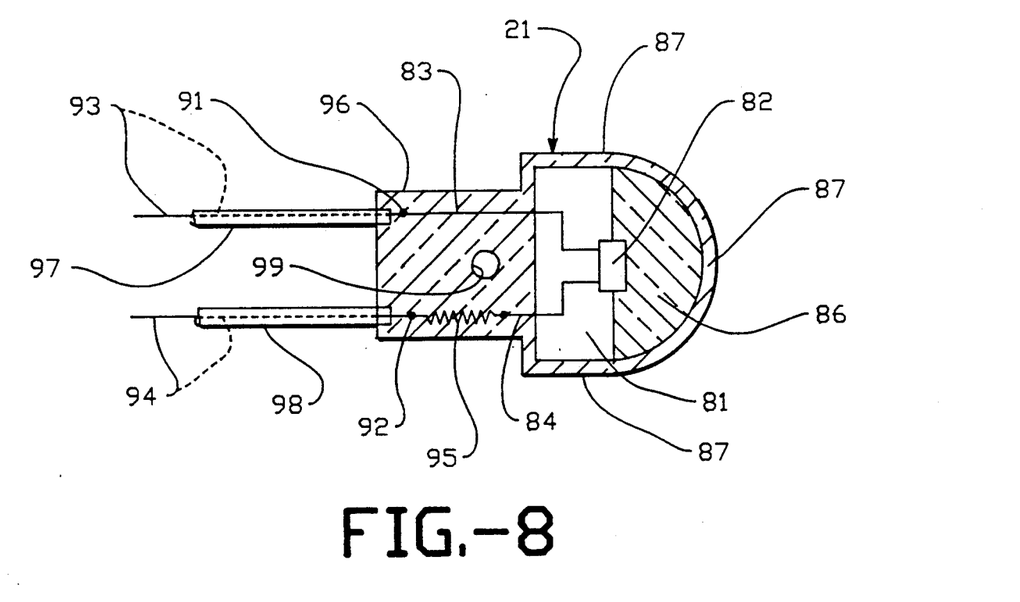
FIG. 8 is an enlarged, side elevation view in cross section of a schematic representation of a light emitting diode encapsulated in accordance with the present invention.

FIG. 8 illustrates schematically a light emitting diode assembly, generally designated 21. Assembly 21 includes a base 81 having diode chip 82 mounted therein. Extending from base 81 are electrical terminal leads 83 and 84 which are coupled for the flow of electricity to chip 82. A transparent lens 86 is mounted to base 81 over and proximate chip 82. The chip and lens are configured to produce a desired light emission pattern from the LED. As thus far described, LED 21 is constructed in a manner known in the prior art.

Conventionally, LED are formed with lenses which can withstand contact with water, but it has been found the standard LED lens cannot withstand prolonged contact without degradation of its properties. More particularly, prolonged submersion of lens 86 in water will result in the lens becoming brittle or impact sensitive. An LED which is merely sealed at terminals 83 and 84, therefore, will rapidly experience a degradation of the lens to the point that even a modest impact during handling of the light will cause shattering of the lens.

In the improved underwater light source of the present invention, therefore, a water impervious layer 87 of material extends over the entire exterior surface of lens 86 to seal lens 86 against contact with water during prolonged submersion. Moreover, it is preferred that layer 87 encapsulate base 81, terminals 83 and 84 and connections 91 and 92 between wires 93 and 94 of conductor means 22. As will be seen in FIG. 8, layer 87 can continue to a cylindrical plug-like portion 96 which extends to and is molded in sealed or potted relation to tubular insulation 97 and 98 on wires 93 and 94. Moreover, plug portion 96 can advantageously be provided with light mounting means, here a transversely extending bore 99.

In order to match or mate the specific LED to power source, it is also advantageous to provide a resistor 95 connected electrically in series between one of leads 83 and 84 and conductor wires 93 and 94. Resistor 95 preferably is potted or molded into base portion 96 of the envelope surrounding or encapsulating the LED.

Figure 2:
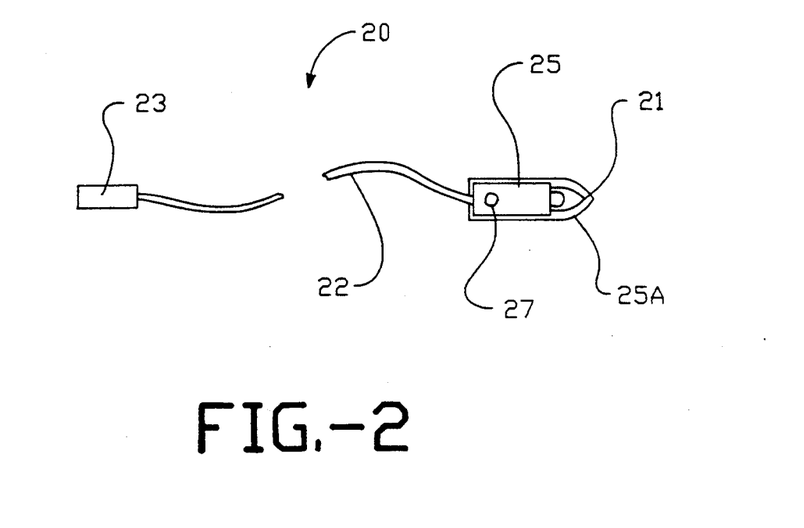
FIG. 2 is a side elevational view of a light source as seen in FIG. 1.

As seen in FIG. 2, light source 21 is coupled to insulated wire 22 and a connector 23 is mounted at the remote end of the conductor wire. The plug-portion 25 has been formed in a separate molding step from the light encapsulating layer 25A. Thus, plug 25 seals the connection of wire 22 to diode 21. Left unsealed, the hygroscopic lenses of commercial LED's will quickly saturate with water and become extremely brittle. The brittle LED's will often shatter under the influence of relatively small impacts. Additionally, the saturated LED's tend to burn out much faster than normal LED's. Accordingly, coating or layer 25, equivalent to layer 87 in FIG. 8, encapsulates the entire light source assembly including plug 25.

As will be described below, borehole 27 is provided to facilitate attaching the light source to either an object within the tank or a tank wall. The insulation on the elongated wire 22 is both waterproof and watertight to insure that bare portions of the electrical wires are never directly exposed to the water within the tank.

Figure 3:
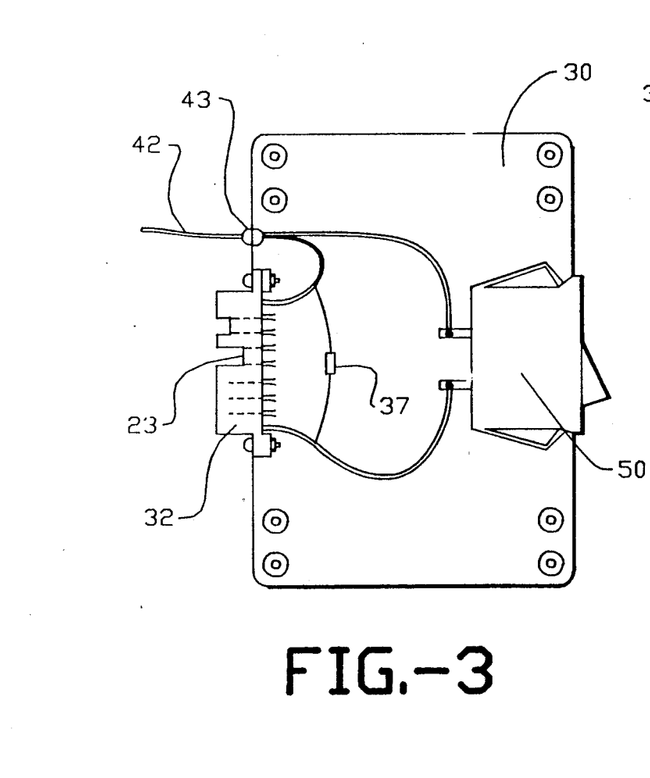
FIG. 3 is a diagrammatic top view of the junction box as seen in FIG. 1 with the cover removed.
Figure 4:
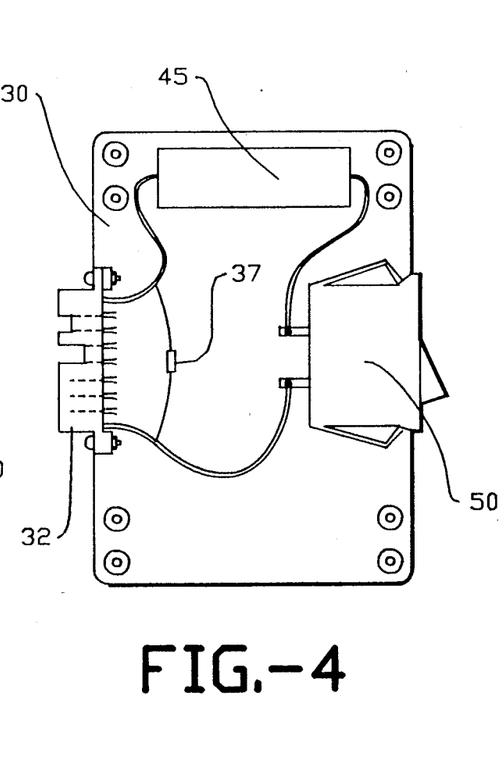
FIG. 4 is a diagrammatic top view of a junction box incorporating an internal power supply.
Figure 5:
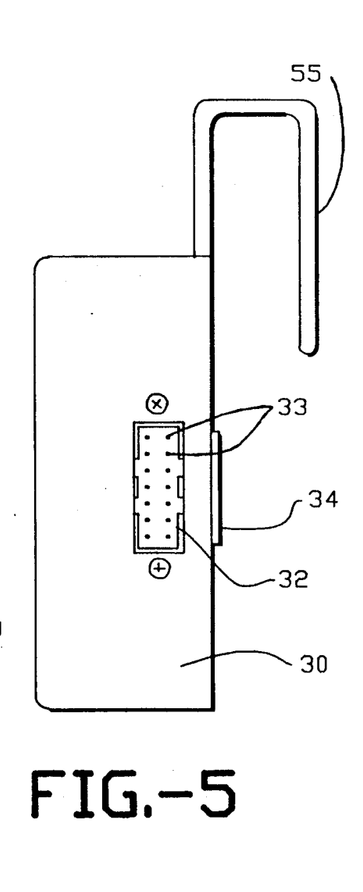
FIG. 5 is a diagrammatic side view of a junction box highlighting the attachment mechanism.
Figure 6:
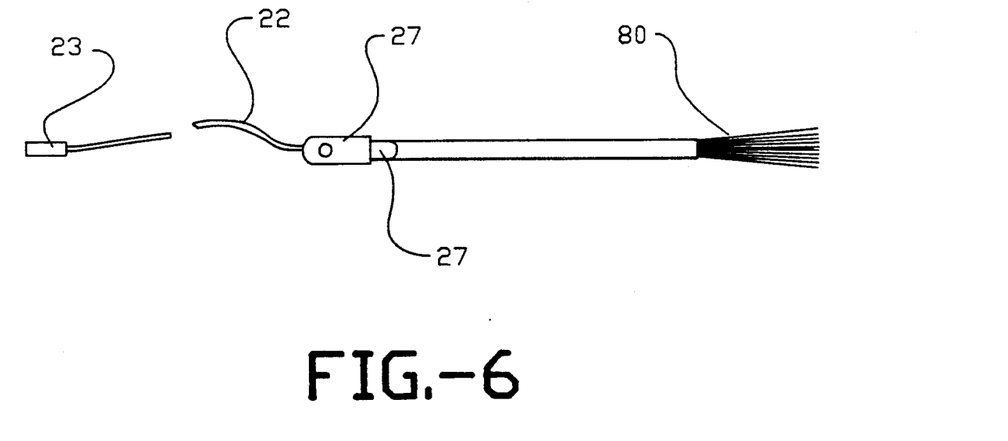
FIG. 6 is a diagrammatic side elevational view of a light source having a fiber optic plume and a suction cup attachment mechanism.

Referring primarily to FIGS. 3-5, the junction box 14 includes a housing 30 that carries at least one connector array 32 that is adapted to mate with one or more light source connectors 23 to electrically couple the power supply 12 and the light sources 20. The power supply may take the form of a step down power transformer 40 as seen in FIG. 1 or a battery pack 45 received within the housing 30 as seen in FIG. 4. In the former embodiment, transformer wire 42 extends from a plug-in type transformer to a transformer connector 43 in the junction box 14. The transformer connector is then wired through an on/off switch 50 to the connector array 32. A current limiting resistor 37 is connected in parallel with the connector array 32 to limit the current provided to the LED's. The step down transformer 40 takes the 120 volt A.C. line voltage and reduces it a D.C. voltage signal suitable for running the light emitting diodes. By way of example, a suitable D.C. voltage level is 2-3 volts, with each light source drawing approximately 25-30 ma.

In the alternative embodiment of the control box 14 shown in FIG. 4, a battery pack 45 replaces the transformer 40 as the power supply. With this arrangement, the battery leads are wired directly to connector array 32 through switch 50.

The connector array 32 consists of a multiplicity of two prong male connectors 33 arranged in side by side fashion. Each connectors 33 is arranged to receive the female connector 23 of a single light source 20. Thus, a multiplicity of light sources may be plugged into and run off of a single connector array. The actual number of connectors 33 in each array 32 may be widely varied depending on the requirements of the system. In the described embodiment either four or eight connectors 33 are provided in the array. It should be appreciated that the junction box 14 may have any number of connector arrays to accommodate larger lighting systems.

Since several wires emanate from the junction box (i.e. the elongated wires for light sources 20 and transformer wire 42), it is desirable to place the junction box 14 in a location where it is unlikely to be inadvertently struck. Therefore, as best seen in FIG. 5, a removable attachment clip 55 is provided on the back side of the junction box 14 to facilitate attaching the junction box directly to tank 3. A screw (not shown) is used to mount the attachment clip to the housing 30. A double sided adhesive strip 34 also secures the junction box to the tank. In an alterative embodiment, a suction cup is provided to couple the junction box to the outer aquarium walls.

Figure 11:
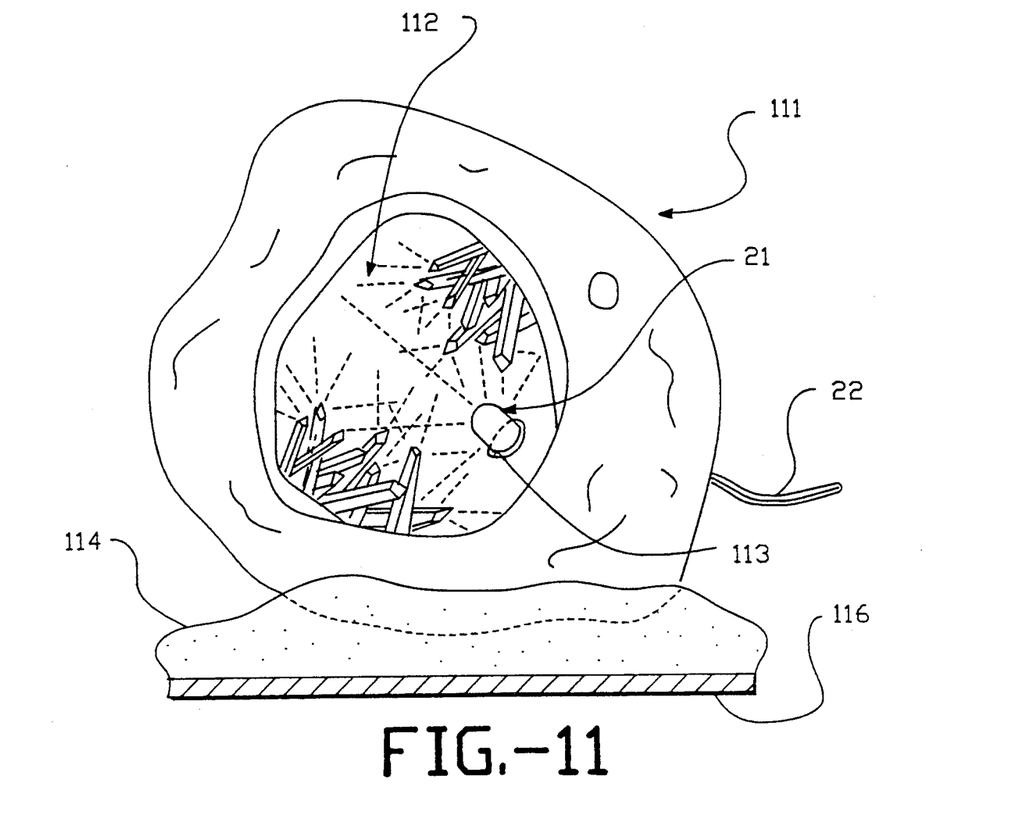
FIG. 11 is a side elevation view of a decorative geode incorporating the light assembly of FIG. 8.

As mentioned above, a cylindrical borehole 27 or 99 extends laterally through the plug 25 or 96 below the connection between the elongated wire 22 and its associated light emitting diode. The borehole is used primarily to facilitate attaching the light source to an object within the tank. As seen in FIG. 1, one manner of attaching the light source to an object (such as plant 61, as seen in FIG. 1) is to pass a tie wrap 60 through the borehole and wrap it around an object placed within the tank. Alternatively, a suction cup 65 may be coupled to the plug using a clip that holds onto the borehole 27. The suction cup can then be used to couple the light source 20 to a flat surface such as the walls of the tank. Additionally, ornamental figurines, such as the lighthouse 63 shown in FIG. 1, can be adapted to receive the light emitting diode end of the light source. 20. In FIG. 11 a geode 111 having a viewing opening 112 in one side thereof and an illumination opening 113 in an opposite side thereof is shown sitting on sand 114 on the bottom 116 an aquarium tank. Mounted in opening 113 is an encapsulated LED assembly 21, which emits light that is reflected off the crystalline interior of the geode.

To construct a light source, a two pronged female connector is secured to one end of a well insulated strip of wire. A wide variety of conventional wires can be used, so long as the insulation is both waterproof and watertight. A conventional light emitting diode is then electrically coupled to opposite end of the wire and the entire unit is suspended within an injection mold. A substantially transparent epoxy resin, such as EnviroTex Lite, manufactured by Environmental Technologies, Inc., of Fields Landing, California, is then pumped into the mold to encapsulate the entire assembly, as shown in FIG. 8, or to form a plug about the LED 21 and its electrical connection with the elongated wire 22, as shown in FIG. 2. A lateral borehole 27 or 99, extending laterally through the plug beneath the LED 21, is formed integrally during molding of the plug as well. A separate ornamental light source having a plume 80 of fiber optic strands may be fabricated in the same manner except that the fiber optic plume is placed at the distal end of the light emitting diode within the injection mold and is secured to the LED during molding. Epoxy resins often make good material to form sealing layers 25A and 87 and/or plug portions 96 and 25 since they are watertight, often clear and relatively quick setting. It is also desirable to have a clear material form the plug portion to minimize the conspicuousness of the light source.

Figure 7:
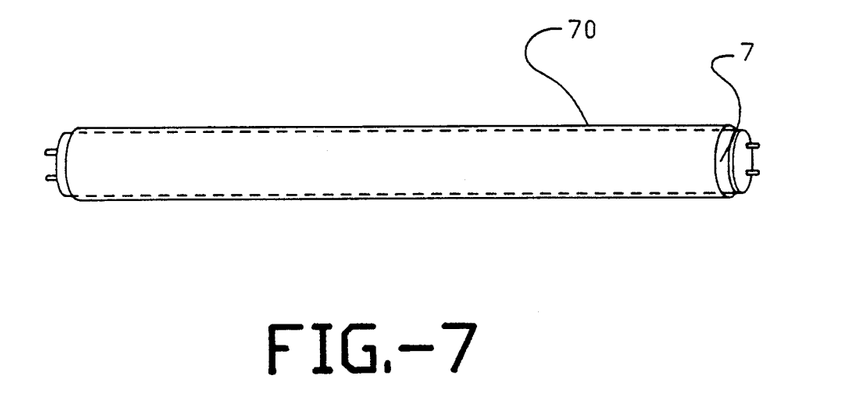
FIG. 7 is a diagrammatic side view of a fluorescent tube shade.

One of the advantages of using light emitting diodes is that they generate relatively low intensity colored light as compared to incandescent bulbs. Thus, they tend to accent the colors within the tank. Since a bright light source tends to wash out colors within the tank, a separate aspect of a tank lighting arrangement incorporates a fluorescent tube shade 70 to both dampen and color the light emitted by conventional fluorescent tubes used in aquarium lighting systems. As seen in FIG. 7, the tube shade 70 forms a cylindrical sleeve which is merely inserted about the fluorescent tube. To minimize manufacturing costs and to allow a single shade to fit over tube sizes, the shade is formed from a single piece of translucent acetate or the like, which is rolled or heat treated to set the sleeve into a cylindrical shape. Since the acetate is somewhat flexible and resilient, it can be readily stretched to fit over the light tube and will spring back to securely encase the tube. The tube shade is preferably sized to extend the entire length of the fluorescent tube. The colors of the tubes may be widely varied based entirely on aesthetic preferences. Indeed, multicolored tubes could be used as well.

Figure 9:
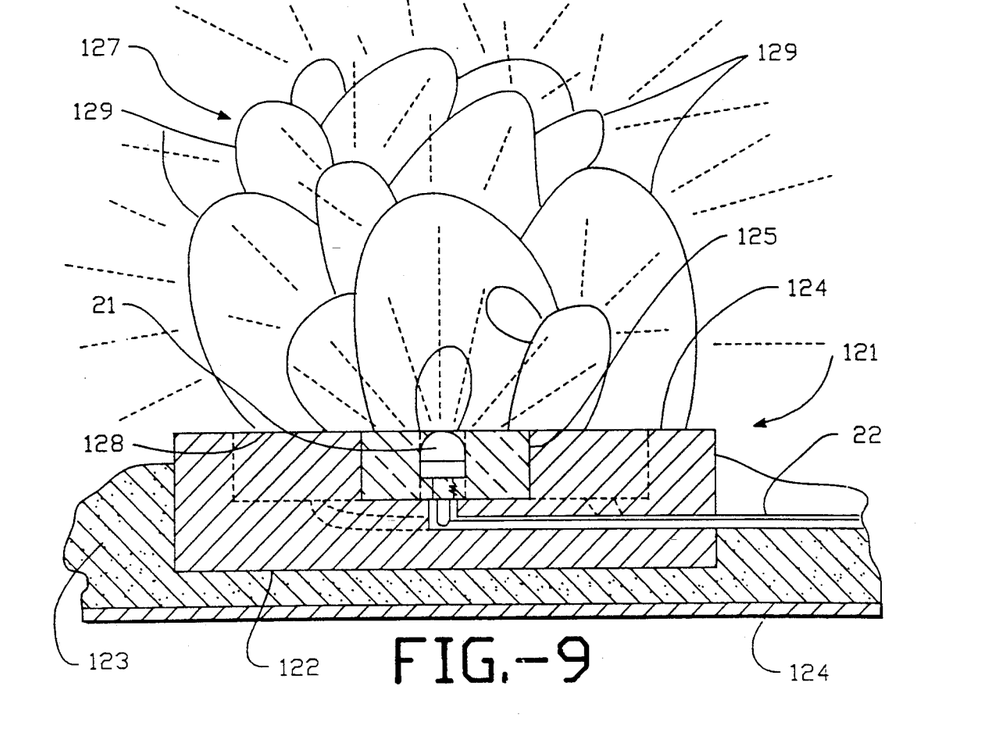
FIG. 9 is a side elevation view, in cross section taken substantially along the plane of line 9—9— in FIG. 10, of a display stand having a light emitting diode as shown in FIG. 8 incorporated therein and used to light a decorative crystal structure.
Figure 10:
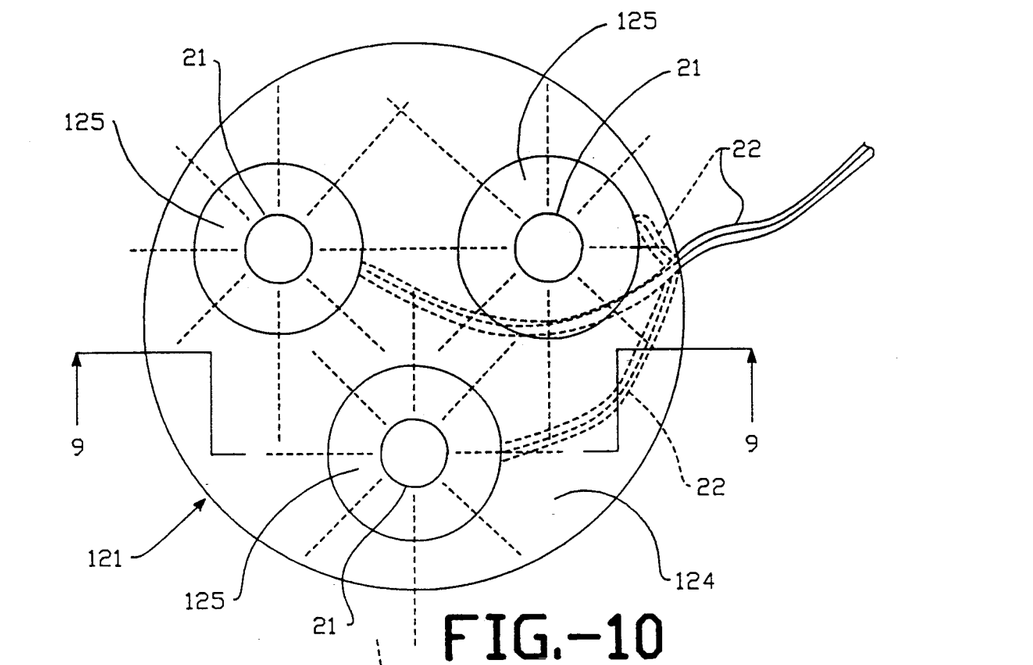
FIG. 10 is a top plan view of the display stand of FIG. 9 with the crystal removed.

One advantage of the light source of the present invention is that it can be easily incorporated into a display stand. As seen in FIGS. 9 and 10, display stand 121 includes a downwardly facing side or surface 122, which is here shown partially buried in said 123 resting on bottom 124 of an aquarium tank. Upwardly facing support surface 126 of stand 121 receives and supports a decorative object, in this case a simulated crystal 127, thereon.

Mounted in support stand 121 for transmission of light in an upwardly direction toward object 127 is at least one light source 21, constructed in accordance with the present invention and molded into a transparent sealing cylindrical envelope or plug 125. Sealing envelope or plug 125 also can have pigment therein to change the color of the light emitted from the encapsulated light source. As shown in FIG. 10, stand 121 includes three encapsulated LED light sources 21, and since object 127 is a simulated crystal formed of a material for the transmission of light therethrough, the light from LED's 21 passes up through base 128 of the crystal and is refracted in various directions from the variously oriented crystal surfaces 129.

As shown in FIGS. 9 and 10, light sources 21 in stand 121 are connected to an exterior source of electricity by wires 22. It will be understood, however, that insulated wires 22 could extend to a battery (not shown) mounted in the base of the stand. As also will be understood display stand has application for use above water, for example, to display crystal collections.

Figure 12:
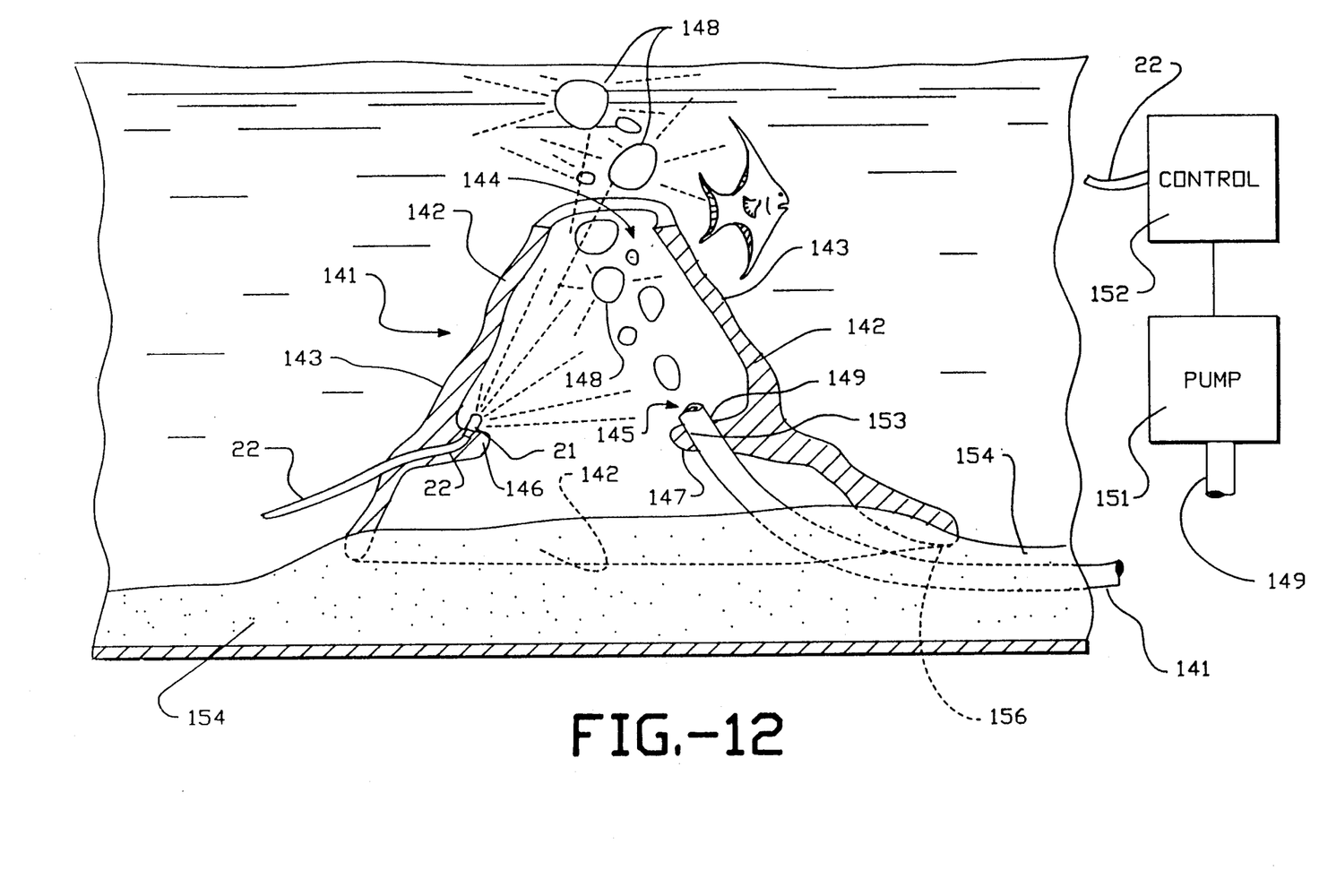
FIG. 12 is a side elevation view, in cross section, of a decorative, aquarium volcano constructed in accordance with the present invention and incorporating the light assembly of FIG. 8.

Finally, the light source of the present invention is particularly well suited for use in a decorative aquarium volcano. FIG. 12 illustrates a decorative volcano, generally designated 141, having a hollow body 142 with an exterior surface 143 shaped to simulate a scale model of a volcano. Proximate a top of body 142 is a volcanic vent-simulating structure 144 which is light transmissive. In the preferred form vent-simulating structure 144 is a generally round opening to the interior of hollow body 142.

In order to simulate volcanic activity, decorative aquarium volcano 141 has a light source 21 mounted thereon, for example on light mounting arm 146. The light preferably is constructed as described in connection with FIGS. 2 and 8. Moreover, it is preferable that decorative volcano assembly 141 include gas discharge means 145 mounted to arm 147 for discharge of a gas, usually air, inside body 142. The discharged gas forms bubbles 148 which buoyantly rise inside body 142 and escape out opening 144. Since light source 21 preferably is directed toward opening 144, bubbles 148 have the appearance of smoke and/or erupting materials coming from the volcano.

If desired, for further simulation effectiveness, gas discharge tube 149 can be connected to pump 151 which is controlled for intermittent operation by control means 152. Operation of light source 21 also can be coupled by wires 22 to controller 152. Thus, programmed or intermittent volcano "eruptions" can be achieved. As will be apparent to aquarium fanciers, an oxygen aerator tube 149 of the type conventionally employed in aquariums can be mounted in a bore 153 or can simply be passed through sand 154 under an edge 156 of the body to discharge air into the volcano's interior.

Although only a few embodiments of the present invention have been described herein, it should be understood that the present invention may be embodied in many other specific forms without departing from the spirit or scope of the invention. Particularly, it should be appreciated that there are a wide variety of conventional materials that may be used to form the light encapsulating envelope. Similarly, any number of light sources may be provided with a single junction box. The light sources could also be arranged to have multiple LED's which emanate from a single, branched wire as seen in FIG. 1. These branched arrangements are particularly desirable for uses wherein a large number of LED's are used within a relatively small area such as within a single ornament or on a single plant. Virtually any type of LED may be used so long as its lens is coated or layered to be watertight or encased. Stroboscopic LED's may also be used for any desired purpose, such as use in lighthouses.

Another advantage of LED's is that traditionally they have extremely long lives compared to most other light sources. However, as indicated above, if the plastic lenses are submerged in water over any substantial period of time, they become brittle and burn out rapidly. Accordingly, in one aspect of the invention it is very important to ensure that when casting LED, the entire exterior surface of the LED lens be covered, such that the LED is completely encapsulated. Without such a complete coating, the expected life of the LED's will be significantly reduced.

It should also be appreciated that a wide variety of fastener arrangements can be used to secure the light sources to various objects within the tank. Additionally, the junction box may be incorporated into the tank cover in an alternative embodiment of the invention. Therefore, the present examples and embodiments are to be considered as illustrative and not restrictive, and the invention is not to be limited to the details given herein, but may be modified within the scope of the appended claims.

What is claimed is:

1. A light source suitable for use in an aquarium while submerged in water comprising:
   a light emitting diode assembly including a base having a diode chip, a transparent lens mounted to said base proximate said chip, and electrical terminal leads electrically coupled to said chip and extending from said base;
   elongated electrically conductive wire means electrically coupled to said terminal leads and having insulation means surrounding said wire means from a position proximate said terminal leads to a position remote therefrom;
   a water impervious, light transmissive layer of material extending over the entire exterior surface of said lens to seal said lens against contact with water; and
   sealing means sealing said terminal leads and said wire means against contact with water, and sealing said terminal leads to said base against entry of water into said diode assembly.

2. A light source as defined in claim 1 wherein, said sealing means and said layer of material are provided by a single, continuous, light-transmissive coating encapsulating said lens, said base, said terminal leads and said wire means up to said insulating means.

3. A light source as defined in claim 1, and resistor means electrically mated to said chip and connected between said terminal leads and said wire means.

4. A light source as defined in claim 1 wherein, said layer of material is provided by a solid plastic material.

5. A light source as defined in claim 1 wherein,
said layer of material produces a color change in light emitted from said diode assembly.

6. A light source as defined in claim 1 wherein,
said sealing means is formed with a mounting aperture in a position maintaining the sealing properties of said sealing means, said aperture being formed to accept an attachment means for attaching said light source to one of an object within said aquarium, and walls of said aquarium.

7. In a submersible light source assembly for an aquarium or the like including an electrical light source, insulated electrical conductor means electrically connected to said light source, and means sealing the connection between said light source and said conductor means, the improvement in said light source assembly comprising:
said light source being provided by a light emitting diode assembly having a lens; and
encapsulating means formed of a light transmissive material and sealing the exterior surface of said lens against contact with water.

8. A light source as defined in claim 7 wherein,
said encapsulating means is provided by a solid plastic material.

9. A light source as defined in claim 7 wherein,
said encapsulating means completely surrounds said light emitting assembly and provides said means sealing the connection between said light source and said base.

10. A light source as defined in claim 7 wherein,
said encapsulating means is formed with a mounting aperture therethrough positioned to maintain the sealing properties of said encapsulating means.

11. In a submersible light source assembly for an aquarium or the like including an electrical light source, insulated electrical conductor means electrically connected to said light source, and means sealing the connection between said light source and said conductor means, the improvement in said light source assembly comprising:
said light source being provided by a light emitting diode assembly having a lens;
encapsulating means formed of a light transmissive material and sealing the exterior surface of said lens against contact with water;
a display stand having a downwardly facing structure formed to engage a support surface for gravity support of said stand in a stable position thereon, and having an upwardly facing display side formed to receive and support a decorative object thereon, and
said light source being mounted to said support stand for transmission of light from said display side upwardly toward a decorative object supported thereon.

12. The light source assembly as defined in claim 11, and
crystal means mounted on said display side and formed of a light transmissive material and with an upper surface refracting light in a multiplicity of directions.

13. The light source assembly as defined in claim 11 wherein,
said display stand includes a planar downwardly facing structure and a planar upwardly facing display side, and
a plurality of said light sources each encapsulated by a light transmissive material and mounted in said display side for transmission of light in an upward direction.

14. In a submersible light source assembly for an aquarium or the like including an electrical light source, insulated electrical conductor means electrically connected to said light source, and means sealing the connection between said light source and said conductor means, the improvement in said light source assembly comprising:
said light source being provided by a light emitting diode assembly having a lens;
encapsulating means formed of a light transmissive material and sealing the exterior surface of said lens against contact with water;
a geode having a viewing opening in one side thereof and an illumination opening in an opposite side thereof, and
said light source being mounted in said illumination opening for transmission of light toward the interior of said geode between said illumination opening and said viewing opening.

15. In a submersible light source assembly for an aquarium or the like including an electrical light source, insulated electrical conductor means electrically connected to said light source, and means sealing the connection between said light source and said conductor means, the improvement in said light source assembly comprising:
said light source being provided by a light emitting diode assembly having a lens;
encapsulating means formed of a light transmissive material and sealing the exterior surface of said lens against contact with water;
a hollow, reduced-scale, volcano-simulating structure having an opening at a top thereof, and
said light source being mounted inside said volcano-simulating structure for transmission of light out said opening at said top.

16. The light source assembly as defined in claim 15, and
gas emitting means mounted for discharge of a gas from within said volcano-simulating structure for buoyant escape of said gas from said opening at said top.

17. The light source assembly as defined in claim 16 wherein,
said gas emitting means is formed for intermittent discharge of gas therefrom,
said light source is formed for intermittent operation of said light emitting diode assembly, and
control means coupled to control discharge of said gas and operation of said light source.

18. In a submersible light source assembly for an aquarium or the like including a light source, and insulated electrical conductor means electrically connected to said light source for transmission of electricity thereto, the improvement in said light source assembly comprising:
said light source is provided by a light emitting diode assembly having a lens;
encapsulating means formed of a light transmissive material surrounding the entire exterior surface of said diode assembly and the electrical connection to said conductor means and sealing the exterior surface of said lens and said connection against contact with water;

a mounting aperture extending through said encapsulating means while maintaining the sealing properties of said encapsulating means; and a tie wrap mounted through said aperture and formed for attaching said light source to one of an object placed within said aquarium and the walls of said aquarium.

19. In a submersible light source assembly for an aquarium or the like including a light source, and insulated electrical conductor means electrically connected to said light source for transmission of electricity thereto, the improvement in said light source assembly comprising:

said light source is provided by a light emitting diode assembly having a lens;

encapsulating means formed of a light transmissive material surrounding the entire exterior surface of said diode assembly and the electrical connection to said conductor means and sealing the exterior surface of said lens and said connection against contact with water;

a mounting aperture extending through said encapsulating means while maintaining the sealing properties of said encapsulating means; and a suction cup mounted through said aperture and formed for attaching said light source to one of an object placed within said aquarium and the walls of said aquarium.

* * * * *